Feb. 28, 1956 A. D. BOOTH 2,736,881
DATA STORAGE DEVICE WITH MAGNETO-STRICTIVE READ-OUT
Filed April 22, 1952 2 Sheets-Sheet 1

INVENTOR
ANDREW DONALD BOOTH
BY Frederick E. Hane
ATTORNEY

DATA STORAGE DEVICE WITH MAGNETO-STRICTIVE READ-OUT

Filed April 22, 1952 2 Sheets-Sheet 2

INVENTOR
ANDREW DONALD BOOTH
BY Frederick G. Hany
ATTORNEY

United States Patent Office
2,736,881
Patented Feb. 28, 1956

2,736,881

DATA STORAGE DEVICE WITH MAGNETO-STRICTIVE READ-OUT

Andrew Donald Booth, Fenny Compton, England, assignor to The British Tabulating Machine Company Limited, London, England, a British company Application April 22, 1952, Serial No. 283,785

Claims priority, application Great Britain July 10, 1951

15 Claims. (Cl. 340—174)

The present invention relates to apparatus for magnetically recording and reproducing data.

It is well known to record data as magnetised areas along a tape or along the surface of a magnetic drum. In order to read out the data the tape or drum must be moved past a pick up device sensitive to changes in magnetic flux.

This method of storage has two disadvantages. Firstly, the data cannot be read out until the appropriate part of the tape or drum has been brought to the reading position. This may involve an appreciable time interval between the reading out of two items of data. Secondly, the speed at which data is read out is determined by the speed at which the drum or tape is moved past the pick up device. Hence if the data is recorded as a train of pulses, for example, the spacing between adjacent pulses will vary if the speed of the motor driving the tape or drum varies.

It is an object of the present invention to provide for the serial read out of data from a magnetic storage member whilst maintaining the storage member and the pick up device substantially stationary relative to each other by propagating a sonic impulse through the part of the member of which data has been recorded.

It is a further object of the invention to provide a data storage apparatus employing a storage member which has the properties of magnetic remanence and of magneto-striction.

It is a further object of the invention to provide a plurality of data input coils and a single pick up or reading coil which reads out the data recorded by all the input coils.

It is still another object of the invention to provide a magnetic data storage device in which the speed of data read out is determined by a physical property of the recording medium and not by the relative speed of movement of the recording member and the pick up device.

It is yet another object of the invention to employ a single device for sonically impulsing two data storage devices to obtain synchronised read out of data from the two devices.

The invention will now be described by way of example with reference to the accompanying drawing.

Figure 1:
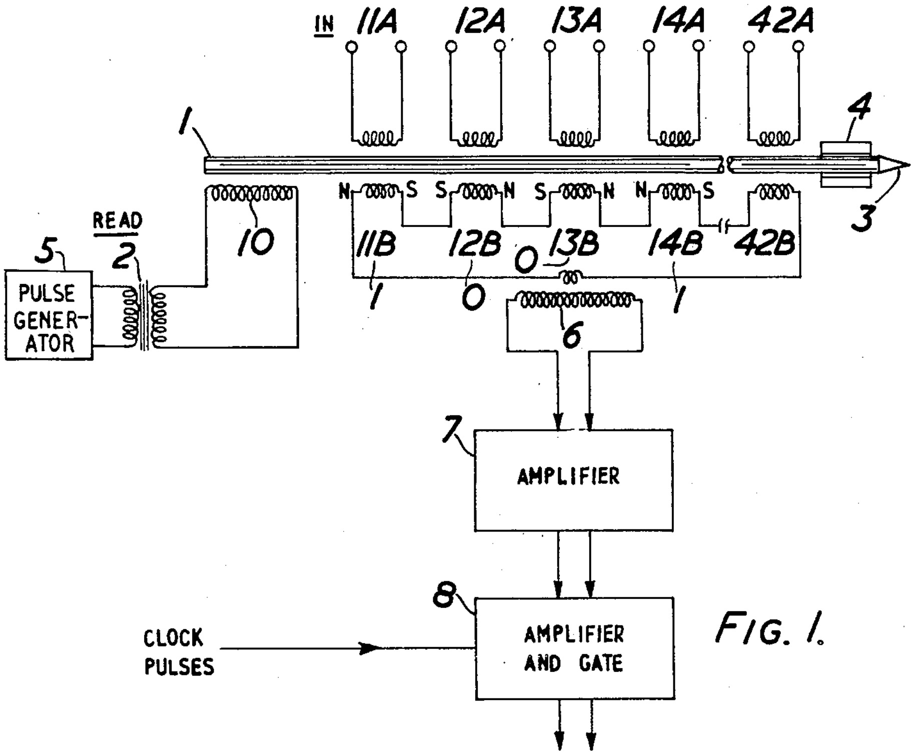
Figure 1 shows a diagrammatic view of one form of the storage device.

A rod 1 has thirty-two data input coils 11A to 42A (Figure 1) wound on it at equally spaced intervals. Over each of the input coils is wound a corresponding output coil 11B to 42B. The thirty-two output coils are connected together in series aiding so that they form in effect a single output coil extending over the whole length of the rod 1 on which data is to be stored. The output coils are connected to the primary winding of a voltage step-up transformer 6.

The rod 1 is made of a material, such as nickel or mumetal which possesses the properties of magnetic remanence and of magneto-striction. A coil 10 is wound on one end of the rod 1 and connected to a transformer 2. The application of an operating impulse to the transformer 2 from pulse generator 5 produces a large current in the coil 10. The resulting magnetic field produces a magneto-strictive stress in the rod 1. This stress may be a contraction or an expansion depending upon the material of which the rod is made. In either case this impulse stress wave is propagated down the rod 1 at a velocity approximately equal to that of sound in the material.

Data is recorded at a particular position on the rod 1 by passing a current in one direction or the other through the appropriate input coils. For example, a current in one direction may represent a binary one and a current in the other direction may represent a binary nought. Alternatively a current in one direction may represent the presence of a particular data item and a current in the other direction the absence of this data item. Preferably the recording currents are of sufficient magnitude to magnetically saturate the portion of the rod 1 on which the coils are wound. This method has the advantage that a correct recording is obtained irrespective of the previous magnetic history of the rod. The recording current may be derived from any suitable source such as, for example, a group of pulse amplifiers controlled by a computer, or manually, by momentary closure of switches 50 (Figure 3) to connect one side of the coils to a positive supply line 51 or a negative supply line 52.

Figure 2:
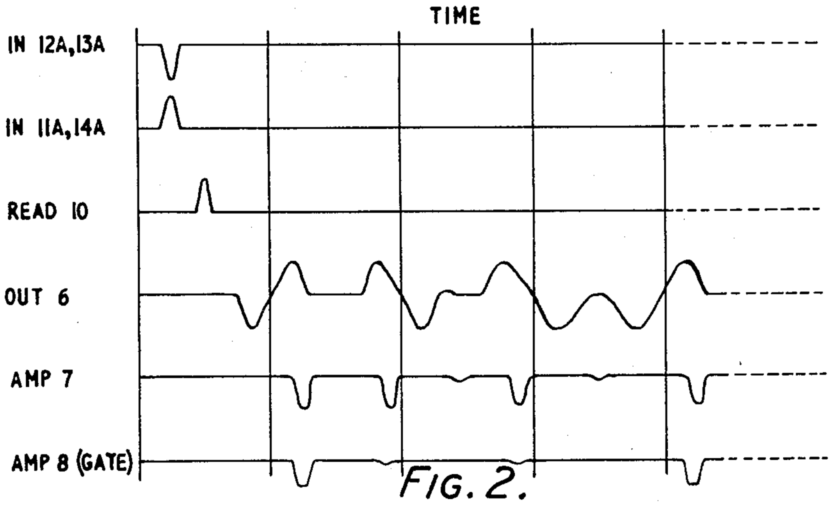
Figure 2 is a diagram showing the relative timing of various wave forms.

If the binary number 1001 is to be recorded by the first four coils on the rod, then the coils 11A and 14A are connected to the positive supply line and the coils 12A and 13A are connected to the negative supply line. (Figures 1 and 2.) Thus areas of rod 1 will be magnetised North and South or South and North as indicated in Figure 1. Since there is no relative movement between the rod 1 and the input coils it is immaterial whether they are all energised simultaneously or in succession.

A sonic impulse, in propagating down the rod 1 from the coil 10, will first pass through the part of the rod on which the coils 11A and 11B are wound. This causes a momentary displacement of the rod, in the direction of its length, relative to the coils. Since this portion of the rod has been magnetised by the current passed through the coil 11A a voltage will be induced in the coil 11B.

The wave form of this voltage is approximately that of a single cycle of a sine wave (Figure 2). As the sonic impulse is propagated down the rod a voltage will be generated in the coil 12B and then the coil 13B and so on. Since the currents through the coils 11A and 12A have magnetised the corresponding areas of the rod in opposite directions the output voltage from the coil 12B will be the inverse of that from the coil 11B.

The output from the transformer 6 is fed to an amplifier 7 employing three stages in cascade. This amplifier is of conventional type except that the last stage has the grid biased below cut off to produce clipping of the negative half of the signals applied to the grid. The resultant output consists of negative pulses corresponding to the positive peaks of the input wave form (AMP7, Figure 2).

Output from the amplifier 7 operates a unit 8 which consists of an inverter amplifier to produce positive pulses from the negative input and a gating device to which these positive pulses are applied. Positive timing or clock pulses are also fed to the gate which gives a negative output when two pulses occur simultaneously. The relative timing of the clock pulses is such that they coincide only with pulses produced from a "one" recording on the rod. Consequently the output from the gate consists of a serial train of pulses representing the "ones" recorded on the rod, with blank positions corresponding to "noughts" on the rod. The output wave form produced by the first four coils is shown as AMPS in Figure 2.

The clock pulses may be derived from an oscillator which is synchronised by the pulse applied to the coil 10. Preferably, however, they are derived from a second storage rod in a manner to be described.

There is a tendency for the sonic impulse to be reflected back from the end of the rod adjacent to the coil 42A. This echo would produce a second read out of the data in reverse order. To prevent this effect, the end 3 of the rod is tapered, to cause scattering and dispersion of the echo. In addition damping pads 4 are clamped on to the rod near its end. These pads may be of any suitable absorbent material such as sponge rubber or neoprene.

A form of the device which has been found practical for storing thirty-two binary digits comprises a mumetal rod 1/16" diameter with the input and output coils, each comprising four turns, occupying 1/8" along the rod and spaced apart 3/8" centre to centre. The transformers 2 and 6 have ratios of 20:1 and 1:20 respectively. The coil 10 consists of ten turns and the damping pad 4 extends approximately 3" along the rod.

Figures 3, 4:
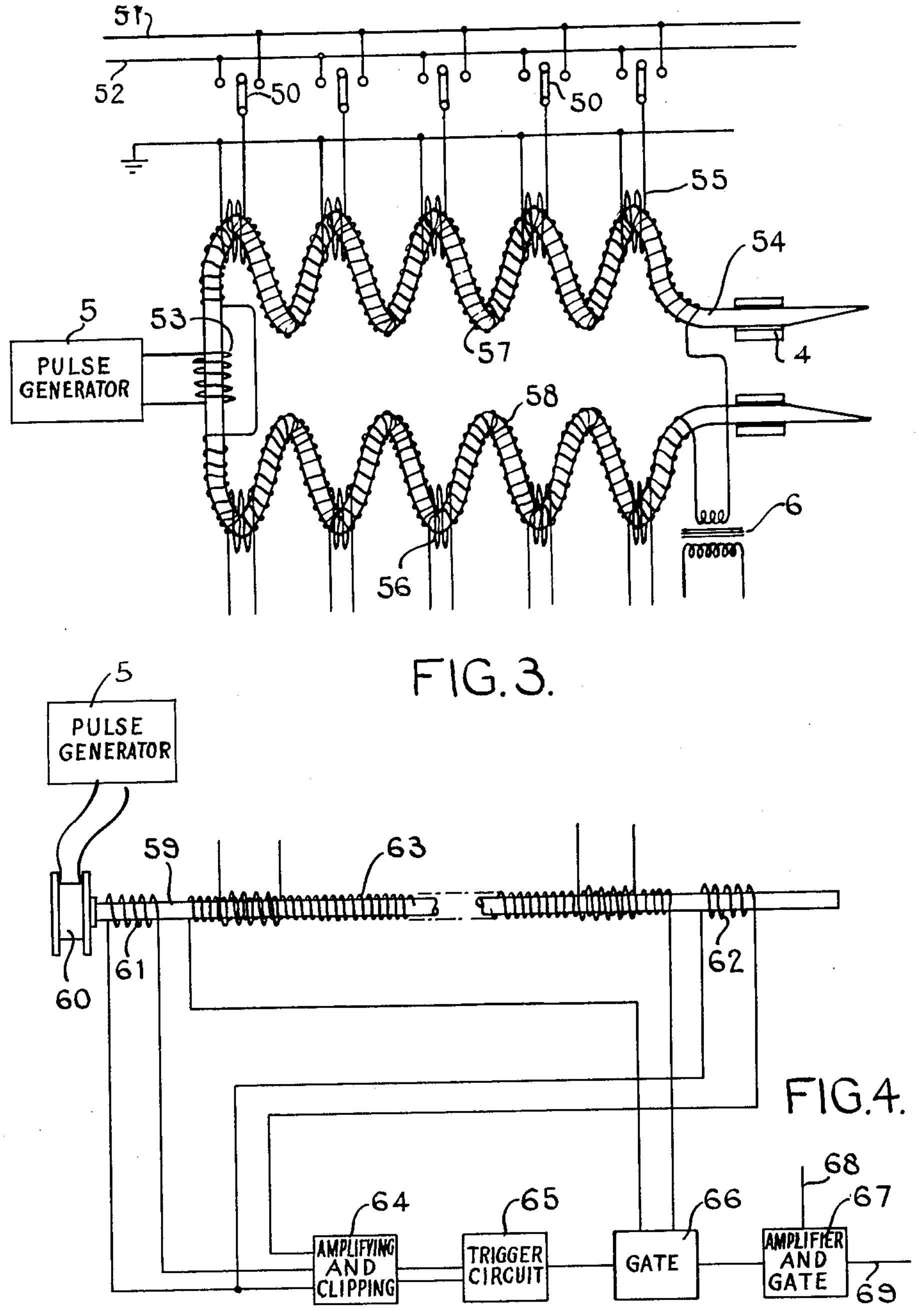
Figure 3 shows two data storage devices each arranged in the form of a helix and having a common sonic impulse source.
Figure 4 shows a circuit in block diagram form for determining the period for which the read out coil is effective.

A modified form of the storage device is shown in Figure 3. The rod 54 is formed into two equal helixes joined by a straight centre section. A sonic impulsing coil 53 connected to the output of pulse generator 5 is wound on this centre section. Separate pickup and readout coils 57 and 58 are provided for the two helical sections. These coils are wound as uniform solenoids, the windings extending the full length of the rod on which data recordings are to be made.

When the coil 53 is impulsed a sonic wave will be propagated from the centre through both halves of the rod and consequently the data recorded on the two halves of the rod by coils 55 and 56 will be read out synchronously. By connecting the coils 57 and 58 in series opposition the induced voltages will substantially cancel each other so long as the data recorded on the two halves of the rod is the same. By connecting the output of the two series connected coils to an amplifier and gating arrangement similar to that of Figure 1 an output pulse will appear only when there is disagreement between the data recorded on the two halves of the rod. Thus this arrangement provides a means for comparing two sets of data for equality.

The use of an impulsing coil centrally situated on a rod also provides a convenient method of generating clock pulse. For example, if a series of "ones" are recorded by coils 56 on the lower half of the rod 54, the output from the coil 58 will comprise a train of uniformly spaced pulses which after amplification and shaping may be used as clock pulses for controlling the readout of data recorded by the coils 55.

Some materials possess suitable properties for use as a magnetic storage medium but do not possess good magneto-strictive properties. Such materials may be used in the storage device by employing a transducer to produce the sonic impulse. For example, the magnetostriction coil may be replaced by a quartz crystal transducer 60 (Figure 4) which is coupled to the end of a rod 59. Thus when the crystal 60 is impulsed by a pulse generator 5 a sonic wave will be transmitted down the rod 59 to cause voltages to be induced in a solenoid pick up coil 63, in the manner already described.

Instead of damping the rod 59, the read out coil 63 may be made effective for only a limited period, such that all spurious responses from it are eliminated. To effect this, two additional coils 61 and 62 are wound on either end of the rod 59. The areas on which the two coils are wound, are permanently magnetised. The outputs from the two coils 61 and 62 are fed through a twin channel amplifying and clipping circuit 64.

When a sonic impulse is propagated along the rod 59 it generates a voltage in the coil 61 which appears as a negative-going pulse of considerable amplitude at the output of the circuit 64. This pulse is applied to one grid of a trigger circuit 65. This trigger circuit is normally off and controls a gate 66 to prevent the voltages generated by the coil 63 being passed by the gate. A pulse from the coil 61 switches the trigger circuit 65 on and thus opens the gate 66 to allow voltages generated by the coil 63 to be fed to a further gating and amplifying circuit 67. This circuit is generally similar to that referenced 7 and 8 in Figure 1. The data read out appears on an output line 69 after gating by clock pulses on a line 68.

After the sonic impulse has passed through the part of the rod 59 used for data recording it causes a voltage to be generated in the coil 62. This voltage is also amplified and clipped by the circuit 64 and the resultant pulse is fed to the other grid of the trigger circuit 65 so switching it off. Thus the gate 66 is closed before the sonic impulse reaches the end of the rod. The returning echo impulse will also produce a voltage in the coil 62 which will be ineffective since the trigger circuit 65 is already off. After passing through the part of the rod on which data is recorded the echo impulse may generate a voltage in the coil 61. It is found in practice however that by this time the impulse has been so reduced in amplitude by reflection and dispersion that the voltage generated by the coil 61 is very much less than that needed to switch the trigger circuit 65. By this means the readout coil 63 is made effective only during the period when read out is actually required.

Although the use of a rod has been described, it will be appreciated that a tape or tube could be used equally well. Also, since the recording member tends to act as a wave guide for a sonic impulse, it may be formed into other shapes than a helix, provided that sharp bends, which tend to cause dispersion are avoided.

What we claim is:

1. A method of storing and reproducing data comprising storing the data on a stationary magnetic member by selectively impressing on said member a plurality of discrete areas of remanent flux in accordance with said data said areas being spaced apart along said member, and reproducing said data as desired by transmitting a single read-out sonic impulse through all said areas and thereby momentarily varying the magnetic fields from said areas and detecting the change of flux resulting from the variation.

2. A method of storing and reproducing data comprising storing said data for as long as desired on a stationary member having substantial magneto strictive properties by impressing on said member a plurality of discrete areas of remanent flux in accordance with said data, said areas being spaced apart along said member, and reproducing said data as desired by generating a single read-out sonic impulse in said member, thereby varying momentarily the magnetic fields of said areas sequentially and detecting the variations in said fields.

3. A method of storing and reproducing data comprising storing said data for as long as desired on a stationary magnetic member by impressing on said member a plurality of discrete areas of remanent flux in accordance with said data, said areas being spaced apart along said member, and reproducing said data as desired by locating electro-magnetic pickup means adjacent to said areas and stationary relative to said member, transmitting a read-out sonic pulse through said member and thereby momentarily varying the flux linkage of each of said areas with said pickup means sequentially.

4. Apparatus for storing and reproducing data magnetically comprising a stationary magnetic member, input coil means on said member for impressing on said member for the period of storage fixed discrete areas of remanent flux in accordance with said data to be stored applied to said coil means electrically, said areas being spaced apart along said member output coil means located about said areas and means for transmitting when desired a read-out sonic pulse through said member and through all said areas, whereby the flux linkages between said areas and said output coil means are momentarily varied and voltages are generated in said output coil means representative of the data stored on said member at said areas.

5. Apparatus for storing and reproducing data magnetically comprising a stationary elongated magnetic member, a plurality of data input coils wound on said member at spaced intervals along said member, an output coil wound on said member and co-extensive with said input coils in accordance with the data to be stored, means for energising said input coils to impress on said member for the period of storage discrete areas of remanent flux spaced along said member and means located at one end of said member for generating when desired a single read-out sonic impulse which is propagated to the other end of said member, whereby said discrete areas representing the stored data induce voltages in the output coil.

6. Apparatus as claimed in claim 5 having an electro-acoustic transducer coupled to said member and means for applying an electric impulse to the transducer to generate a sonic impulse in said member.

7. Apparatus for storing and reproducing data magnetically comprising a stationary elongated member having the properties of magnetic remanence and magnetostriction, a plurality of data recording coils and output coils wound at spaced intervals along the central part of said member, means for energising the recording coils in accordance with the data to be stored to impress on said member for the period of storage discrete areas of remanent flux spaced apart along said member and representative of the stored data, a coil wound adjacent to one end of said member, for generating when desired a read-out sonic impulse in the member by means of the magneto-strictive effect and means adjacent the other end of said member for substantially attenuating the sonic impulse after propagation through the member, whereby the sonic impulse causes voltages to be generated in the output coil representative of the stored data.

8. Apparatus for storing and reproducing data magnetically comprising a stationary elongated magnetic member, a plurality of data recording coils wound at spaced intervals on the central part of the member, an output coil wound on said central part of the member, means, adjacent to one end of the member, for generating when desired a read-out sonic impulse which is propagated along the member, first control means, intermediate said impulsing means and said central part, and second control means, intermediate said central part and the other end of said member, both said first and second control means being responsive to the passage of the sonic impulse past them, switching means controlled jointly by said first and second means and gating means controlled jointly by said switching means and by data representing voltages induced in the output coil by the passage of said sonic impulse.

9. Apparatus as claimed in claim 8 in which said first and second control means each comprises a coil wound on a part of the member which is permanently magnetised.

10. Apparatus as claimed in claim 9 comprising also signal amplifying and shaping means operated by said first and second control means and an electronic trigger circuit which is switched to one stable state by the output of one of said shaping means and is switched to the stable state by the other of said shaping means.

11. Apparatus for storing and reproducing data magnetically comprising a stationary elongated magnetic member, means located centrally for propagating a sonic impulse in both halves of said member, a plurality of data recording coils wound at spaced intervals on each half of the member, means for energising said recording coils to store data on the member as spaced discrete areas of remanent flux and an output coil wound on each half of the member whereby voltages are induced therein by the passage of the sonic impulse through those parts of the member on which data has been stored.

12. Apparatus as claimed in claim 11 having common signal amplifying means for both of said output coils, which are connected in series opposition.

13. Apparatus as claimed in claim 11 having signal gating means controlled jointly by the voltages induced in said two output coils.

14. Apparatus as claimed in claim 11 in which the two halves of the member are shaped in the form of helixes.

15. A method of storing and realing-out a plurality of items of data comprising recording said data on an elongate stationary magnetic member for the period of storage by selectively magnetising said member in accordance with said data to form discrete areas of remanent flux spaced apart along said member, each said area corresponding to one said item and having a polarity dependent on said item, said areas being retained until removed as desired at the end of the storage period, and reading-out said data when required by generating a single read-out sonic pulse through said member, thereby varying momentarily and sequentially the magnetic fields of said storage areas and detecting the variations in said fields.

References Cited in the file of this patent

UNITED STATES PATENTS

| | | |
|---|---|---|
| 2,423,339 | Newman | July 1, 1947 |
| 2,466,018 | Ferrill | Apr. 5, 1949 |
| 2,587,593 | Camras | Mar. 4, 1952 |
| 2,612,603 | Nicholson | Sept. 30, 1952 |
| 2,629,827 | Eckert | Feb. 24, 1953 |

OTHER REFERENCES

British Journal of Applied Physics, vol. 2, October 1951, p. 304.

Electrical Communication, vol. 28, March 1951, pp. 46—53.